United States Patent
Pevec et al.

(10) Patent No.: US 11,934,217 B2
(45) Date of Patent: Mar. 19, 2024

(54) IC CARD REGULATOR

(71) Applicant: STMicroelectronics Razvoj Polprevodnikov D.O.O., Ljubljana (SI)

(72) Inventors: Albin Pevec, Ljubljana (SI); Nejc Suhadolnik, Preserje (SI); Vinko Kunc, Ljubljana (SI); Maksimiljan Stiglic, Maribor (SI)

(73) Assignee: STMicroelectronics Razvoj Polprevodnikov D.O.O., Ljubljana (SI)

( * ) Notice: Subject to any disclaimer, the term of this patent is extended or adjusted under 35 U.S.C. 154(b) by 0 days.

(21) Appl. No.: 18/158,170

(22) Filed: Jan. 23, 2023

(65) Prior Publication Data
US 2023/0273634 A1    Aug. 31, 2023

(30) Foreign Application Priority Data
Feb. 25, 2022   (EP) ...................................... 22158957

(51) Int. Cl.
    *G05F 1/575*    (2006.01)
(52) U.S. Cl.
    CPC ................... *G05F 1/575* (2013.01)
(58) Field of Classification Search
    USPC ......... 327/530, 538–544; 323/265–281, 299, 323/303; 307/64, 65, 80, 43
    See application file for complete search history.

(56) References Cited

U.S. PATENT DOCUMENTS

| | | | | |
|---|---|---|---|---|
| 6,002,295 A | * | 12/1999 | Gens | G05F 1/59 327/541 |
| 7,723,969 B1 | * | 5/2010 | Li | G05F 1/565 323/276 |
| 8,129,861 B2 | * | 3/2012 | Kuhl | G05F 1/46 307/80 |
| 8,207,719 B2 | * | 6/2012 | Shiota | G05F 1/59 323/273 |
| 8,328,098 B2 | * | 12/2012 | Kim | G06K 19/07769 235/441 |
| 8,944,334 B2 | * | 2/2015 | Cho | G06K 19/07769 235/487 |

(Continued)

FOREIGN PATENT DOCUMENTS

DE    102013106078 A1    12/2013
EP       3208748 A2       8/2017

(Continued)

*Primary Examiner* — Thomas J. Hiltunen
(74) *Attorney, Agent, or Firm* — Slater Matsil, LLP

(57) ABSTRACT

In accordance with an embodiment, a linear voltage regulator includes: a first transistor coupled between a first input terminal and an output terminal, the first input terminal adapted to receive a first voltage, and the output terminal adapted to provide a regulated voltage; a second transistor coupled between a second input terminal and the output terminal, the second input terminal adapted to receive a second voltage; and an amplifier of a difference between a third voltage proportional to the voltage at the output terminal and a reference voltage, an output of said amplifier being selectively coupled to a control terminal of the first transistor and to a control terminal of the second transistor, the amplifier being supplied by a fourth voltage corresponding to a highest voltage of the first voltage and the second voltage.

18 Claims, 3 Drawing Sheets

(56) References Cited

U.S. PATENT DOCUMENTS

| | | | |
|---|---|---|---|
| 8,981,741 B2* | 3/2015 | Conte | H02M 3/1584 |
| | | | 323/350 |
| 9,274,533 B2* | 3/2016 | Lee | G06K 19/07749 |
| 2019/0391608 A1* | 12/2019 | Cao | G05F 1/59 |

FOREIGN PATENT DOCUMENTS

| WO | 2008028132 A2 | 3/2008 |
|---|---|---|
| WO | 2008042764 A1 | 4/2008 |

\* cited by examiner

IC CARD REGULATOR

CROSS-REFERENCE TO RELATED APPLICATIONS

This application claims the priority benefit of European Patent Application No. 22158957, filed on Feb. 25, 2022, which is hereby incorporated by reference.

TECHNICAL FIELD

The present disclosure relates generally to electronic circuits and more particularly to integrated circuit cards.

BACKGROUND

Integrated circuit cards, also known as smart cards or IC cards, are well known. It becomes increasingly frequent that IC cards operate both in contact and contactless mode. Recent developments of IC cards aim at equipping the cards with peripheral systems such as fingerprint sensors, dynamic readable verifying codes, display, etc.

SUMMARY

One embodiment provides a linear voltage regulator comprising: a first transistor between a first input terminal, adapted to receive a first voltage, and an output terminal adapted to provide a regulated voltage; a second transistor between a second input terminal, adapted to receive a second voltage, and said output terminal; an amplifier of the difference between a third voltage proportional to the voltage at said output terminal, and a reference voltage, an output of said amplifier being selectively coupled to respective control terminals of said first and second transistors, said amplifier being supplied by a fourth voltage corresponding to the highest voltage between said first and second voltages.

According to an embodiment, said output of the amplifier is coupled by a first switch to the control terminal of said first transistor and by a second switch to the control terminal of the second transistor, said first and second switches being respectively controlled by first and second control signals.

According to an embodiment, the control terminal of each of the first and second transistors is pulled-up to the fourth voltage.

According to an embodiment, a third and a fourth switches respectively couple the control terminals of the first and second transistors to the fourth voltage, the third and fourth switches being controlled by the respective inverses of the first and second control signals.

According to an embodiment, a voltage divider of the regulated voltage provides the third voltage.

According to an embodiment, the regulator further comprises a circuit having two inputs respectively coupled, preferably connected to said first and second input terminals and one output providing the fourth voltage.

According to an embodiment, said circuit comprises a comparator of the first voltage and the second voltage, which controls switches selectively coupling the first input terminal and the second input terminal to said output providing the fourth voltage.

According to an embodiment, said second voltage is a voltage extracted from an electromagnetic field.

An embodiment provides an integrated circuit card comprising a regulator.

According to an embodiment, the card, comprises: external contacts adapted to receive said first voltage; an antenna adapted to capture an electromagnetic field; and a rectifier adapted to provide said second voltage from said electromagnetic field.

According to an embodiment, the card further comprises a first integrated circuit and an electronic system external to the integrated circuit, said regulated voltage being intended to supply said external system.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the operation of an integrated circuit card or smart card, has not been detailed, the voltage regulator of the present disclosure being compliant with usual operation of such card.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Some embodiments of the present invention address improvements of integrated circuit cards. In particular, some embodiments address improvement in the power supply of a peripheral device included in an IC card.

Figure 1:
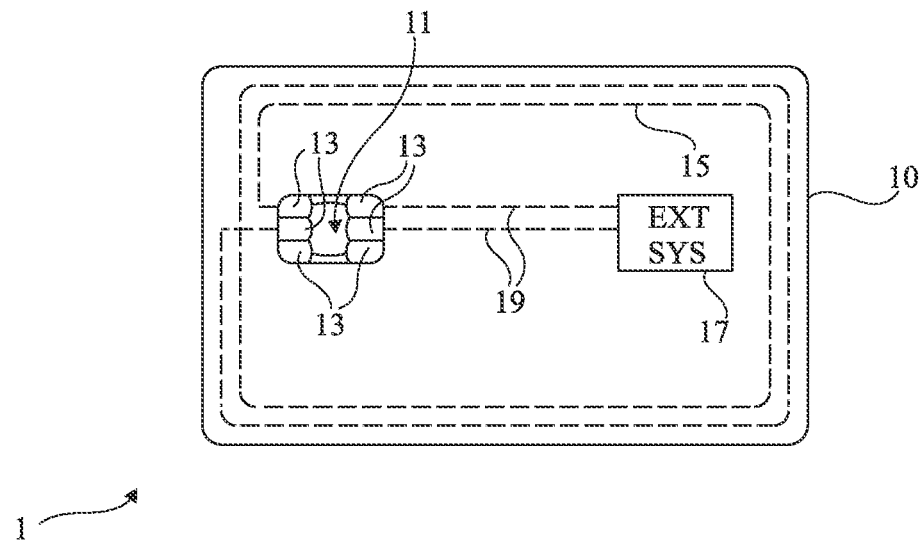
FIG. 1 schematically represents an embodiment of an integrated circuit card.

FIG. 1 schematically represents an embodiment of an integrated circuit card. As shown, an integrated circuit card 1, or IC card, or smart card, to which apply the disclosed embodiments comprises: a plastic (or other non-conductive material) card 10; at least one integrated circuit chip 11 (IC chip) embedded in card 10; physical electrically conductive contacts 13, accessible from one surface of the card 10 and coupled, preferably connected, to the IC chip 11; an antenna 15 (represented in doted lines) embedded in card 10 and coupled, preferably connected, to the IC chip 11 for wireless operation; and an electronic system or circuit 17 (EXT SYS) embedded in card 10 but external to the chip 11 and coupled, preferably connected, to the chip 11, via conductors 19 embedded into card 10.

The IC chip 11 contains electronic circuits adapted to the application of the card 1. For example, chip 11 comprises a microcontroller adapted to operate and control the other elements of card 1 depending on the application.

A card 1, as illustrated in FIG. 1 is usually designated a dual interface smart card. The card has two interfaces: one contact interface to communicate with a contact reader and one contactless interface to communicate with a wireless reader (NFC or the like). Depending on whether the card 1 is inserted in a contact reader or is located within the range of a contactless reader, its electronic circuits are powered via the contact interface or via the wireless interface (via the field generated by the contactless reader).

To render the operation of the card 1 compliant with both contact power supply and contactless power supply, chip 11 usually comprises voltage regulators capable of providing supply voltages to the rest of the chip 11.

The increase of the functionalities of IC cards and of the number of embedded electronic components, such as external (to the chip 11) systems or circuits 17, increases the power requested by the card to operate. Both contact and contactless readers are capable to provide such increased powers. However, the size of the voltage regulators integrated to the card becomes increasingly important.

Additionally, dedicated regulators are provided for such external or peripheral circuits 17 as their requested voltage level can be different than those of the main circuit (microcontroller) of chip 11.

An example of application is a banking card with fingerprint sensor. Another example of application is a banking card with a display of a changing card verification value (cvv). Still another example of application is a card (not necessarily a banking card) with a sensor such as a fingerprint sensor, a temperature sensor, an image sensor, etc. Yet another example of application is a card with a display, for example a counter value display or an image display, etc. In such applications, the external circuit 17 is a sensor such a fingerprint sensor, a temperature sensor, a cvv display, counter value display, an image display, etc.

The value of the power voltage used by the external embedded system or circuit 17 depends on the application. However, it is desirable to provide a single integrated circuit 11 capable of providing the appropriate voltage to various external circuits 17 in order to increase mass-market production of the main integrated circuit 11, which can then be used for different applications depending on the nature of the external circuit 17 of the card.

Figure 2:
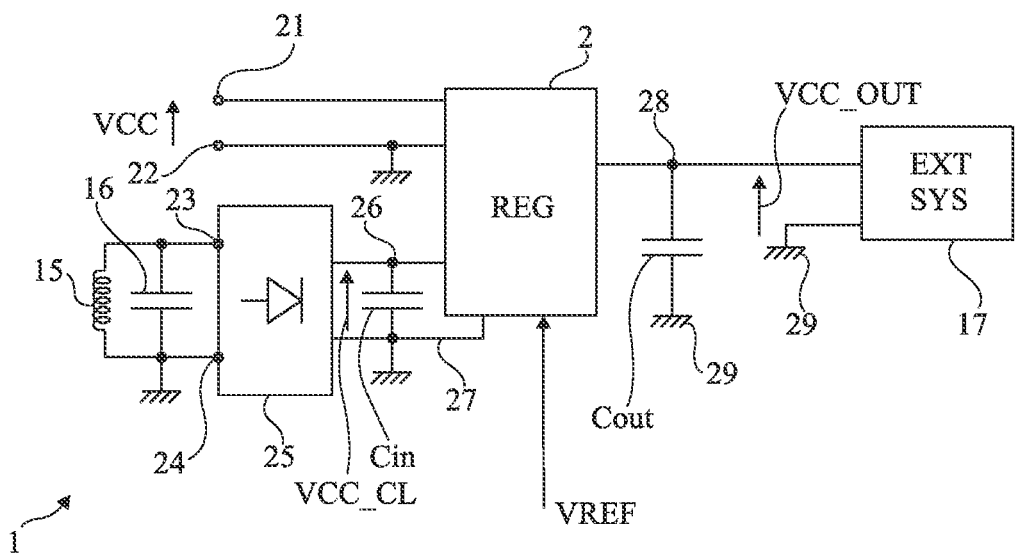
FIG. 2 illustrates, schematically and partially, an embodiment of a power supply architecture of a dual interface integrated circuit card.

FIG. 2 illustrates, schematically and partially, an embodiment of a power supply architecture of a dual interface integrated circuit card. As shown, the dual interface circuit card 1 comprises a voltage regulator 2 (REG) for regulating a voltage VCC provided by a contact reader (not shown) or a voltage VCC_CL extracted from the field generated by a contactless reader (not shown).

When the card 1 is inserted in a contact reader, the dc voltage VCC is present between two contacts 21 and 22 of the contacts 13 (FIG. 1) of the card. Two inputs of the regulator circuit 2 are respectively coupled, preferably connected, to the contacts 21 and 22.

When the card 1 is in the range of a contactless reader generating an electromagnetic field, an oscillating circuit of card 1, comprising the antenna 15 and a parallel capacitor 16 (integrated or not in circuit 11), extracts a signal from the field generated by the reader. Terminals 23 and 24 of the oscillating circuit are coupled, preferably connected, to a rectifier 25, which extracts a dc voltage VCC_CL from the signal present at terminals 23 and 24 of the oscillating circuit. Two inputs of the regulator circuit 2 are respectively coupled, preferably connected, to rectified outputs 26 and 27 of the rectifier 25. In practice, these outputs are also connected by a capacitor Cin.

When operating in contact mode, other terminals 13 of the card 1 are used by the integrated circuit 11 to communicate with the contact reader.

When operating in contactless mode, the integrated circuit 11 communicates with the contactless reader via antenna 15. For this purpose, communication circuits (no shown) of circuit 11 are coupled to the terminals 23 and 24 of the oscillating circuit.

The functional operation of the card in contact mode or in contactless mode will not be further detailed as the present disclosure concerns the power supply of peripheral device 17 of the card 1 and more particularly the regulation of the voltage provided in contact mode or in contactless more.

An output 28 of regulator circuit 2 provides a regulated voltage VCC_OUT to the external system 17 of card 1. The regulated voltage VCC_OUT is, arbitrarily, positive with respect to ground 29 provided either by terminal 22 in contact mode of by terminal 27 in contactless mode. The value of the regulated voltage VCC_OUT depends on a value of a reference voltage VREF provided to the regulator 2 by another element (for example a bandgap) of the integrated circuit 11 (not shown). The value of the regulated voltage VCC_OUT depends on the application and more particularly to the type of external circuit 17. As a specific example, the value of the output regulated voltage VCC_OUT can range from 1.4 volts to 2.5 volts and can take more than 10 different values in this range depending on the application.

Figure 3:
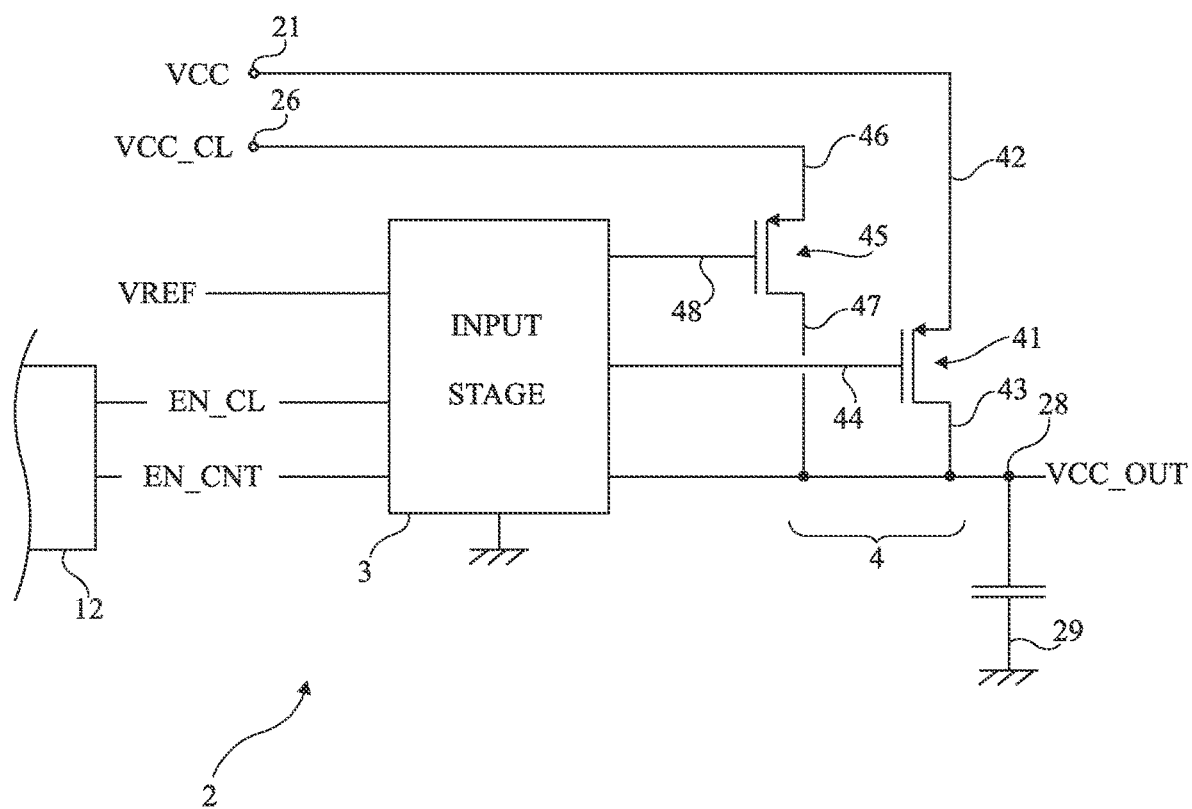
FIG. 3 illustrates, schematically and partially, an embodiment of a voltage regulator of an integrated circuit card.

FIG. 3 illustrates, schematically and partially, an embodiment of a voltage regulator of an integrated circuit card. As shown, the regulator 2 is a linear regulator or Low Drop-Out (LDO) regulator. Power transistors of the regulator 2 couple the respective input terminals of the voltages to be regulated to the output terminal providing the regulated voltage.

The regulator 2 comprises: an output stage 4 comprising two transistors 41 and 45 having one conduction terminal respectively coupled, preferably connected, to terminal 21 of application of the voltage VCC and to terminal 26 of application of the voltage VCC_CL, and the other conduction terminal coupled, preferably connected, to the common output terminal 28 providing the regulated voltage VCC_OUT; an input stage 3 (INPUT STAGE) receiving the reference voltage VREF, the regulated output voltage VCC_OUT, and providing an analog control signal to the control terminals of transistor 41 or 45 depending on the operating mode (contact/contactless), selected by digital control signals EN_CL and EN_CNT provided by a microcontroller 12 of circuit 11.

In the exemplary embodiment of FIG. 3, transistors 41 and 45 are MOS transistors (preferably PMOS transistors). Respective sources 42 and 46 of transistors 41 and 45 are coupled, preferably connected, to terminals 21 and 26. Respective drains 43 and 47 of transistors 41 and 45 are coupled, preferably connected, to output terminal 28. Respective gates 44 and 48 of transistors 41 and 45 are coupled, preferably connected, to the input stage 3 of the regulator 2. According to the disclosed embodiments, both power transistors 41 and 45 of regulator 2 share a common input stage 3.

Figure 4:
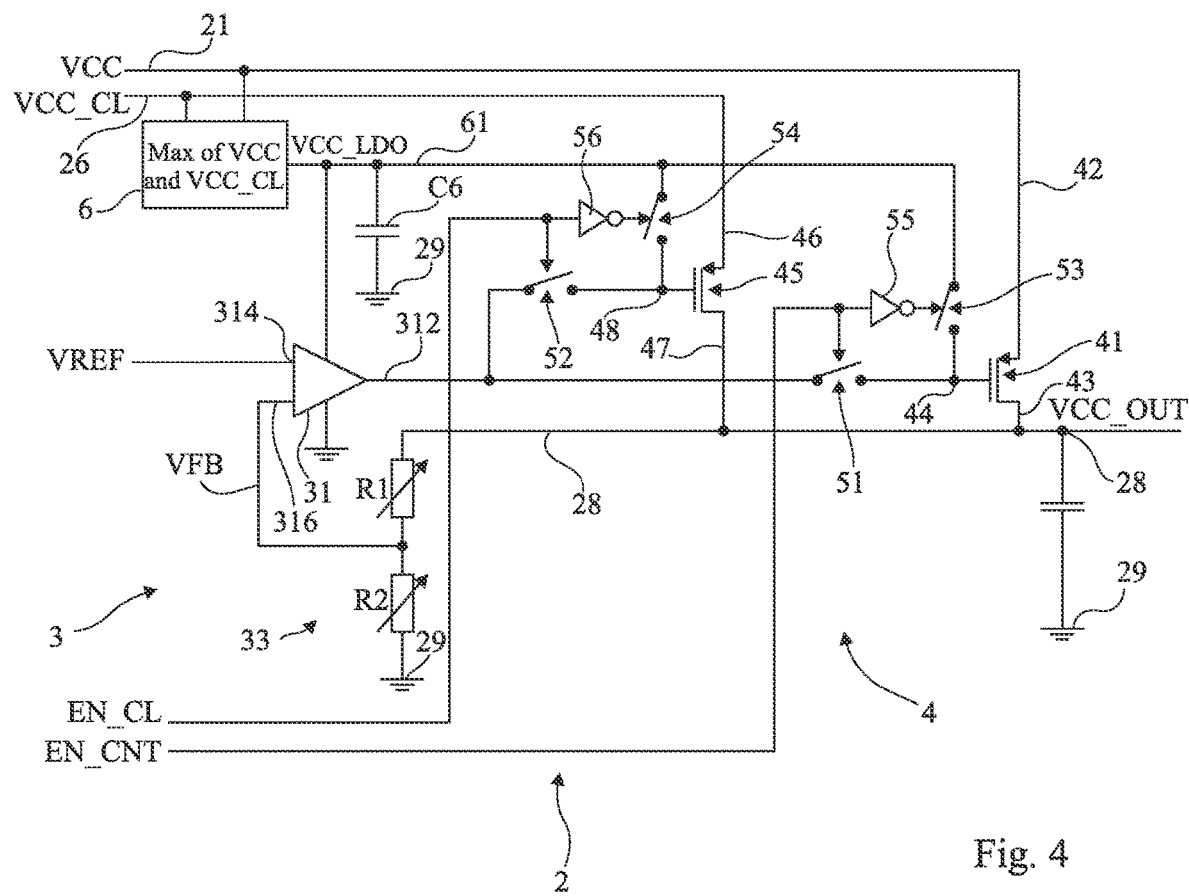
FIG. 4 schematically details an embodiment of the regulator of FIG. 3.

FIG. 4 schematically details an embodiment of the regulator 2 of FIG. 3. The input stage 3 of the regulator 2 comprises an error amplifier 31, or gain stage, of the difference between a feedback voltage VFB, proportional to the regulated output voltage VCC_OUT, and the reference voltage VREF. The amplifier 31 provides, at an output 312, an analog signal, function of this difference between voltages VCC_OUT and VREF, to control the gate 44 or 48 of transistor 41 or 45. The reference voltage VREF, provided by the circuit 11 is applied to an input 314 of the amplifier 31. The feedback voltage VFB, proportional to the value of the output voltage VCC_OUT, is provided by a feedback voltage divider 33 receiving the output voltage VCC_OUT and providing the voltage VFB to an input 316 of the amplifier 31. In the example of FIG. 4, the voltage divider 33 is made of two resistors R1 and R2 connected in series between the output terminal 28 and ground 29, the mid-point of the series connection forming the output of the voltage divider 33 providing the feedback voltage VFB.

According to an embodiment, the value of the referenced voltage VREF is fixed and do not depend on the voltage requested by the external system. Resistors R1 and R2 are then, for example, trimmable resistors, which are trimmed according to the application (depending on the value of the supply voltage of the external circuit 17) to select the value of the output voltage VCC_OUT. According to another example, the voltage divider is made of a network of controllable resistors, configured by the microcontroller 12 (FIG. 3) based on the desired supply voltage for the external circuit 17.

According to another embodiment, the value of the reference voltage VREF is provided by the microcontroller 12 of integrated circuit 11 depending to a personalization of the circuit. Resistors R1 and R2 can then have fix values.

As it can be seen from FIG. 4, the regulator 2 comprises only one feedback resistor chain, which is used in both operation modes.

In order to select the transistor 41 or 45 to be controlled by the error amplifier 31, switches 51 and 52 are provided between the output 312 of the amplifier 31 and the respective gates 44 and 48 of transistors 41 and 45. The switch 51 couples the terminal 312 to the gate 44 of the transistor 41 and the switch 52 couples the terminal 312 to the gate 48 of the transistor 45. The switch 51 is controlled to be fully on or fully off by the enabling signal EN_CL. The switch 52 is controlled to be fully on or fully off by the enabling signal EN_CNT. The selection of the switch 51 or 52 to be on is made by the microcontroller 12 depending on the selected operation mode (contact or contactless).

According to an embodiment, the regulator 2, and more particularly its input stage 3, comprises a circuit 6 (maximum of VCC and VCC_CL), which selects the maximum or highest voltage between voltages VCC and VCC_CL and provides, at an output terminal 61 of circuit 6, this maximum voltage as an internal supply VCC_LDO. A capacitor C6 couples terminal 61 to ground 29.

The error amplifier 31 is supplied by the voltage VCC_LDO. This ensures a correct biasing of the bodies (bulks) of the transistors of the gain stage. This also guarantees a correct excursion of the control signal provided at the amplifier output 312.

Additionally, the bodies of the PMOS transistors 41 and 45 are biased by the voltage VCC_LDO. This avoids a conduction of the parasitic diodes of the transistor 41 or 45, which is not in operation if the output voltage VCC_OUT is higher than the source voltage of that transistor.

According to an embodiment, the gate of the transistor 41 or 45 that is not in operation, is pulled up to the maximum voltage VCC_LDO between VCC and VCC_CL. This guarantees a null or positive gate-source voltage (Vgs) of the corresponding transistor, i.e., an off state of that transistor, which is therefore not leaking whatever is the value of its source voltage.

According to the embodiment represented in FIG. 4, The respective gates of transistors 41 and 45 are coupled to the output terminal 61 of circuit 6 by switches 53 and 54, respectively controlled by the inverses of signals EN_CNT and EN_CL. The signal EN_CNT is applied, via an inverter 55, to the control terminal of switch 53. The signal EN_CL is applied, via an inverter 56, to the control terminal of switch 54.

According to another embodiment, the respective gates of the transistors 41 and 45 are coupled to terminal 61 via pull-up resistors.

Figure 5:
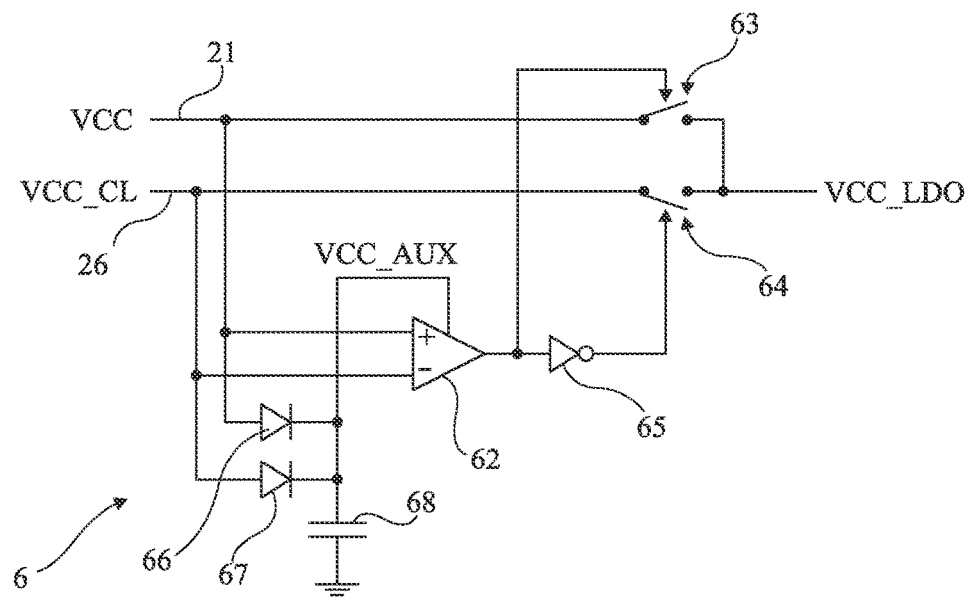
FIG. 5 schematically details an embodiment of a bloc of the voltage regulator of FIG. 4.

FIG. 5 schematically details one embodiment of the circuit 6 of the voltage regulator 2 of FIG. 4. A comparator 62 has its input terminals respectively coupled, preferably connected, to the terminals 21 and 26 providing the voltages VCC and VCC_CL. For example, the non-inverting (positive) input (+) of the comparator 62 is coupled, preferably connected, to terminal 21 and the inverting (negative) input (−) of the comparator 62 is coupled, preferably connected, to terminal 26. In this example, the output of the comparator 62 is high if the contact voltage VCC is higher than the contactless voltage VCC_CL and is low if the contactless voltage VCC_CL is higher than the contact voltage VCC. The comparator 62 controls two switches 63 and 64 respectively coupling the terminals 21 and 26 to the output terminal 61 providing the selected voltage VCC_LDO. For example, the output of the comparator 62 directly controls switch 63 and controls, via an inverter 65, switch 64.

A supply voltage VCC_AUX of the comparator 6 is provided by an auxiliary power supply, based on the highest voltage between VCC and VCC_CL. To this purpose, terminals 21 and 26 are respectively coupled, via diodes 66 and 67, to the positive supply terminal of comparator 62. The anodes of the diodes 66 and 67 are respectively coupled, preferably connected, to terminals 21 and 26. The cathodes of the diodes 66 and 67 are coupled, via a capacitor 68 to ground.

Using an internal voltage VCC_LDO corresponding to the highest voltage between VCC and VCC_CL, is particularly useful in the application to a contactless system. Indeed, the value of the voltage VCC_CL is variable and can be higher or lower of the voltage VCC depending on multiple factors such as the distance form a reader, some perturbations of the field generated by the reader, etc. Additionally, while the voltage VCC is only present when the card is inserted in a contact reader, an electromagnetic field can be present and captured by the antenna 15 (FIG. 1) anywhere.

The switches 51, 52, 53, 54, 63, 64, which are on/off switches, can be made of MOS transistors. The sizes of these transistors can be much lower than the size of transistors 41 and 45 as the vehiculated power is much lower. This is in particular true for switches 51, 52, 53 and 54. For switches 63 and 64, the power is a bit higher than those of switches 51 to 54 as they should be capable of powering the error amplifier 31. However, this stays much lower than the power of transistors 41 and 45.

An advantage of the disclosed embodiments is the ability to reduce the area occupied by the power regulating system with respect to conventional cards using two distinct linear regulators.

Another advantage of the disclosed embodiments is that the sharing of the input stage 3 of the regulator 2 for the contact mode and the contactless mode significantly reduces the testing time needed for the chip. This is in particular the case for cards requiring different output voltage options.

Various embodiments and variants have been described. Those skilled in the art will understand that certain features of these embodiments can be combined and other variants will readily occur to those skilled in the art. In particular, the voltage regulator proposed in the present disclosure has been detailed in relation with an example of application to an integrated circuit card but more generally applies to any wire and wireless device to which similar problems arise.

Finally, the practical implementation of the embodiments and variants described herein is within the capabilities of those skilled in the art based on the functional description provided hereinabove. In particular, the adaptation of the switches and transistors to the voltages applied to their connection terminals and to the current passing through them, based on the application, is in the capabilities of those skilled in the art.

What is claimed is:

1. A linear voltage regulator comprising:
a first transistor coupled between a first input terminal and an output terminal, the first input terminal adapted to receive a first voltage, and the output terminal adapted to provide a regulated voltage;
a second transistor coupled between a second input terminal and the output terminal, the second input terminal adapted to receive a second voltage; and
an amplifier of a difference between a third voltage proportional to the regulated voltage at the output terminal and a reference voltage, an output of said amplifier being selectively coupled to a control terminal of the first transistor and to a control terminal of the second transistor, the amplifier being supplied by a fourth voltage corresponding to a highest voltage of the first voltage and the second voltage;
a comparator configured to: compare the first voltage and the second voltage, and control switches selectively coupling the first input terminal and the second input terminal to an output configured to provide the fourth voltage;
a first diode coupled between the first input terminal and a supply terminal of the comparator;
a second diode coupled between the second input terminal and the supply terminal of the comparator; and
a capacitor coupled between the supply terminal of the comparator and a supply node.

2. The regulator of claim 1, wherein
the output of the amplifier is coupled by a first switch to the control terminal of the first transistor and coupled by a second switch to the control terminal of the second transistor;
the first switch is controlled by a first control signal; and
the second switch is controlled by a second control signal.

3. The regulator of claim 2, wherein the control terminal of the first transistor and the control terminal of the second transistor are configured to be pulled-up to the fourth voltage.

4. The regulator of claim 3, further comprising:
a third switch configured to couple the control terminal of the first transistor to the fourth voltage, wherein the third switch is configured to be controlled by an inverse of the first control signal; and
a fourth switch configured to couple to the control terminal of the second transistor to the fourth voltage, wherein the fourth switch is configured to be controlled by an inverse of the second control signal.

5. The regulator of claim 1, wherein a voltage divider of the regulated voltage provides the third voltage.

6. The regulator of claim 1, further comprising a circuit having inputs respectively coupled to the first input terminal and to the second input terminal, and the output configured to provide the fourth voltage.

7. The regulator of claim 1, wherein the second voltage is extracted from an electromagnetic field.

8. An integrated circuit card comprising the regulator according to claim 1.

9. The card of claim 8, further comprising:
external contacts coupled to the first input terminal and adapted to receive the first voltage;
an antenna adapted to capture an electromagnetic field; and
a rectifier adapted to provide the second voltage from the electromagnetic field.

10. The card of claim 8, further comprising a first integrated circuit, wherein the regulator is configured to provide the regulated voltage to an electronic system external to the first integrated circuit.

11. An integrated circuit card system comprising;
a voltage regulator comprising:
an amplifier having a first input coupled to a reference voltage node and a second input coupled to an output node of the voltage regulator,
a first transistor having a first conduction terminal coupled to the output node of the voltage regulator, a second conduction terminal coupled to a first supply terminal configured to receive a first supply voltage provided by a contact reader, and a control terminal selectively coupled between the output node of the amplifier and a first voltage node configured to provide the disabling voltage, and
a second transistor having a first conduction terminal coupled to the output node of the voltage regulator, a second conduction terminal coupled to a second supply terminal configured to receive a second supply voltage provided by an electromagnetic field of a contactless card reader, and a control terminal selectively coupled between the output node of the amplifier and the first voltage node configured to provide the disabling voltage, and
a supply selection circuit configured to
couple the first supply terminal to a power supply input of the amplifier via a supply selection circuit output node when a voltage of the first supply terminal is higher than a voltage of the second supply terminal, and
couple the second supply terminal to the power supply input of the amplifier via the supply selection circuit output node when a voltage of the second supply terminal is higher than a voltage of the first supply terminal, wherein the supply selection circuit comprises: a comparator having inputs coupled to the first supply terminal and the second supply terminal, a first diode coupled between the first supply terminal and a supply terminal of the comparator, a second diode coupled between the second supply terminal and the supply terminal of the comparator, and a capacitor coupled between the supply terminal of the comparator and a supply node.

12. The system of claim 11, wherein the supply selection circuit comprises:
 a first switch coupled between the first supply terminal and the supply selection circuit output node, the first switch having a control terminal coupled to an output of the comparator; and
 a second switch coupled between the second supply terminal and the supply selection circuit output node, the second switch having a control terminal coupled to an output of the comparator, wherein a switching state of the first switch is opposite a switching state of the second switch.

13. The system of claim 11, further comprising a switching circuit comprising:
 a first switch coupled between the supply selection circuit output node and the control terminal of the first transistor;
 a second switch coupled between the supply selection circuit output node and the control terminal of the second transistor;
 a third switch coupled between the output node of the amplifier and the control terminal of the first transistor; and
 a fourth switch coupled between output node of the amplifier and the control terminal of the first transistor.

14. The system of claim 11, wherein the output node of the voltage regulator is coupled to the second input of the amplifier via a resistive voltage divider.

15. The system of claim 11, further comprising:
 an antenna; and
 a rectifier coupled to the antenna and to the second supply terminal.

16. The system of claim 15, wherein the antenna comprises an LC tank circuit and the rectifier comprises a diode.

17. A method of operating an integrated circuit card comprising a voltage regulator having an amplifier, a first transistor coupled between a first supply terminal and voltage regulator output, and a second transistor coupled between a second supply terminal and the voltage regulator output, the method comprising:
 determining whether the a voltage of the first supply terminal is greater than a voltage of the second supply terminal, determining comprising using a selection circuit comprising:
  a comparator configured to compare the voltage of the first supply terminal and the voltage of the second supply terminal,
  a first diode coupled between the first supply terminal and a supply terminal of the comparator,
  a second diode coupled between the second supply terminal and the supply terminal of the comparator, and
  a capacitor coupled between the supply terminal of the comparator and a supply node;
 coupling the first supply terminal to a power supply node of the amplifier and to a control node of the first transistor and disabling the second transistor when the voltage of the first supply terminal is greater than the voltage of the second supply terminal; and
 coupling the second supply terminal to the power supply node of the amplifier and to a control node of the second transistor and disabling the first transistor when the voltage of the first supply terminal is not greater than the voltage of the second supply terminal.

18. The method of claim 17, further comprising receiving power wirelessly from an antenna via the second supply terminal.

* * * * *